July 21, 1964

A. BRUEDER 3,141,935

DOUBLE-ACTION INERTIA SWITCH

Filed July 5, 1961

United States Patent Office 3,141,935
Patented July 21, 1964

3,141,935
DOUBLE-ACTION INERTIA SWITCH
Antoine Brueder, Paris, France, assignor to Societe Anonyme Andre Citroen, Paris, France
Filed July 5, 1961, Ser. No. 123,372
Claims priority, application France July 5, 1960
2 Claims. (Cl. 200—61.46)

This invention relates to inertia switches of the type used inter alia in preventing over-braking of road vehicles, as well as to over-braking prevention means incorporating such switches.

The sudden application of strong brakes to the wheels of a high-speed motor vehicle on a wet and slippery road surface invariably results in skidding, thereby both reducing the effectiveness of the brakes in bringing the vehicle to a prompt standstill and introducing a grave hazard in parting uncontrollable swerving motions to the vehicle.

To overcome this situation and prevent a positive blocking of the wheels by violent over-braking while still permitting a maximum application of the brakes consistent with safety, it has been proposed to provide an inertial switch associated with a wheel of the vehicle and responsive to the rate of deceleration thereof consequent on braking, to actuate an electric circuit acting to cut off the braking pressure as the rate of deceleration, exceeds a prescribed safety limit indicative of wheel blocking. On the wheel block being removed as a consequence of the operation of the inertia switch, the reaction force from the road surface reaccelerates the wheels of the vehicle and braking pressure is re-applied.

Conventional inertia switches of this character have generally comprised a pair of contacts respectively provided on a part rotated with a wheel of the vehicle and on a fly- or inertia-wheel, mounted for relative rotation with respect to said part, which contacts are adapted to be closed to complete a brake-disengaging circuit on the relative rotation between the flywheel and part in predetermined sense exceeding a predetermined amount indicative of excessive deceleration of the vehicle wheel, the flywheel being normally restrained against relative rotation in the said sense by a spring.

Thus, in the U.S. Patent 2,972,027, there is described an especially advantageous construction of such inertia switch, wherein a friction slip drive is interposed between the vehicle wheel axle and the part rotatable therewith, in order to minimize the usual tendency for the contacts to rebound after closure and the attendant instability in the operation of the brake control circuit. While inertia switches according to this patent have operated better in this respect than earlier switches lacking the friction slip drive, experience has now shown that in certain circumstances the desired stability in braking operation is not completely achieved.

More specifically, I have found that for certain critical adjustments of the inertia switch, which are desirable with fast and/or heavy vehicles in order to ensure high sensitivity to incipient wheel blocking while yet permitting a maximum degree of application of the brakes, there is a tendency for the brake control circuit to "chatter," or hunt, i.e., open and close in rapid succession, thereby causing a corresponding rapid alternation of brake application and release actions. It is the prime object of this invention to overcome this drawback of prior inertial switches.

The unstable operation just described can be explained by the following sequence of events. After the inertia switch first operates to release the braking action the wheel is rapidly re-accelerated by contact with the road surface, at a rate of re-acceleration that is the higher as the previous deceleration, i.e., the initial braking pressure applied, was stronger. This results in a separation of the contacts of the inertia switch, so that the brakes are re-applied. The ensuing deceleration again causes the inertia switch to operate and release the brakes, and in exteme cases this alternating process can repeat many times before the wheels have finally been decelerated to a safe velocity at which the inertia switch no longer operates, whereupon the brakes remain applied. It is a specific object of this invention to prevent the occurrence of this objectionable hunting type of operation in earlier over-braking prevention systems for motor vehicles. Another object is to povide an improved inertia switch which will be responsive both to excessive deceleration and to excessive acceleration of a revolving element.

In accordance with the invention, I provide means in the inertia switch whereby the switch responds not only to excessive deceleration but also to excessive re-acceleration of the vehicle wheel, by closing a related pair of contacts in either event. The closure of either pair of contacts is operative to release the braking pressure. It will be clear that with such an arrangement, after initial extreme deceleration and initial closure of the deceleration-responsive contacts to release the brakes, the subsequent extreme re-acceleration of the wheel will immediately act to close the acceleration-responsive contacts, so that the brakes will be again released, and in practice the actions will proceed so rapidly that the brakes may remain, in effect, continually released until the wheels have decelerated to a safe velocity at which no skidding can occur, at which time both contacts will remain open and the brakes will remain applied.

An exemplary embodiment of the invention will now be described without limitative intent with reference to the accompanying drawings, wherein.

Figure 1:
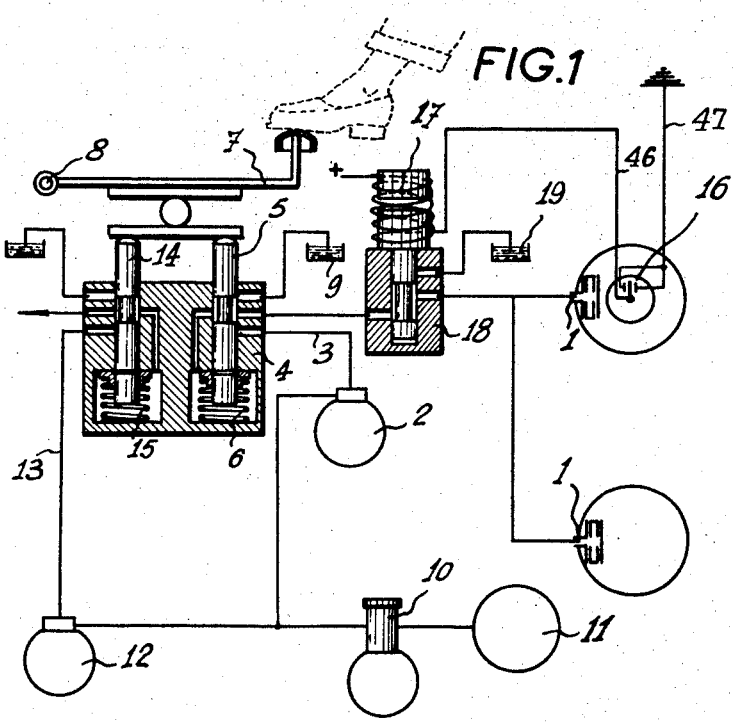
FIG. 1 is a schematic view, with parts shown in section, illustrating a braking system provided with the novel double-acting inertia switch of the invention.

Referring to FIG. 1, there is diagrammatically indicated at 1 a rear wheel brake cylinder of a vehicle, and at 2 a hydraulic pressure accumulator constituting a secondary accumulator of the system as will be later described. Brake cylinder 1 is connected with the accumulator 2 by way of a line 3, a control valve 4 and an inertia-actuated valve 18, later described. The control valve 4 comprises a casing in which a valve spool 5 is slidable which spool is biased by a spring 6 to the position shown in which the spool provides connection from rear brake cylinder 1 to an exhaust reservoir 9, so that the brakes are released. Shown at 7 is a conventional brake pedal pivoted at 8 and which is depressible by the driver's foot to depress the valve spool 5, through any suitable mechanical transmission such as the bearing ball and plate schematically shown. When the spool is thus depressed through the pedal in opposition to spring 6, the spool cuts off the connection from brake cylinder 1 to reservoir 9, and provides communication from said brake cylinder to the pressure accumulator 2 to apply the brakes. Suitable constructions of valve 4 to achieve this result are well-known in the art, and one example of such construction is clearly apparent from the drawing so that further description is superfluous.

As shown, the control valve 4 just described which constitutes the rear wheel brake control valve of the vehicle is arranged for simultaneous actuation from brake pedal 7 with an identical valve which constitutes the front wheel brake control valve. This latter is shown as including spool 14 and bias spring 15 contained in a common valve housing with the rear brake valve described above. With brake pedal 7 in its upper position shown, valve spool 14 provides connection from a front wheel brake cylinder (not shown) corresponding to rear brake cylinder 1 and connected with the line indicated by an arrow, to the exhaust reservoir (shown separate from reservoir 9 for convenience). On depression of pedal 7, valve spool 14 is depressed simultaneously with spool 5 to provide connection from said front wheel brake cylinder (not shown) through a line 13 to a front wheel brake accumulator 12 corresponding to rear accumulator 2.

Both the front accumulator 2 and rear accumulator 12 are secondary accumulators which are supplied in parallel from a primary or main pressure accumulator 10 wherein a prescribed pressure is maintained by means of a pump 11. The braking pressure supply circuit including the pump and the various accumulators is shown very schematically since it forms no part of the present invention and it will be understood that the system is actually provided with the necessary valving and other ancillary equipment for maintaining the desired pressure values in the accumulators.

As noted above the connection from front accumulator 2 to rear wheel brake cylinder 1 includes the inertia-responsive valve 18, which is arranged for electric actuation by means of a solenoid 17. In the deenergized condition of the solenoid (as shown), valve 18 provides communication from brake cylinder 1 to the control valve 4. On solenoid 17 being energized, however, through means presently described, the valve spool is shifted to cut off the said communication and, instead, to connect the brake cylinder 1 with the reservoir shown at 19. A spring (not shown) may be provided to bias the spool of valve 18 to its opening position.

Figure 2:
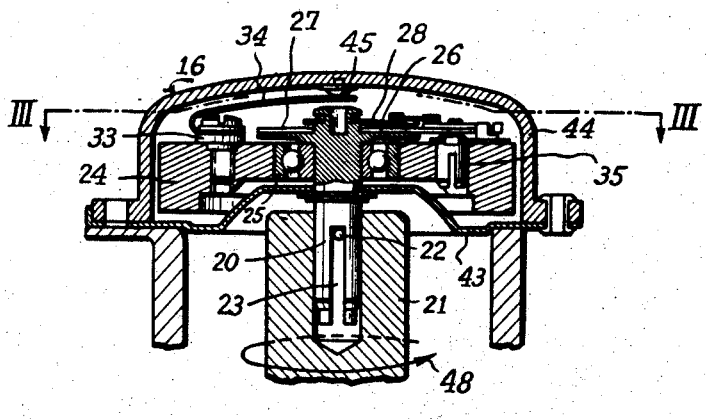
FIG. 2 is an axial sectional view of the novel inertia switch.
Figure 3:
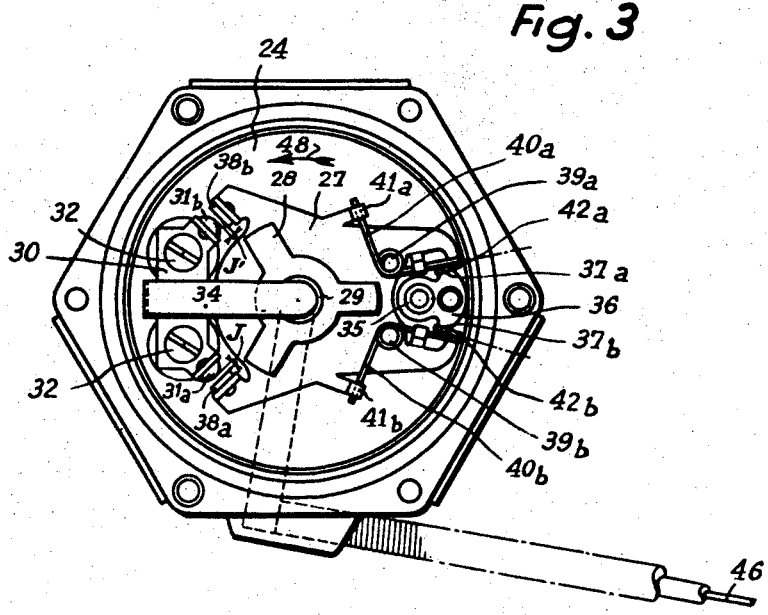
FIG. 3 is a plan view on line III—III of FIG. 2.

Energization of solenoid 17 is controlled by means of a double-action inertia switch according to the invention schematically shown at 16 in FIG. 1, and now to be described in detail with reference to FIGS. 2 and 3.

Said switch comprises a shaft 20 adapted to be fitted into an axial recess of a wheel axle partly shown at 21, and to be locked in rotation therewith by a cotter pin 22 engaged through a slot 23 in shaft 20. Rotatably mounted on the upper end of shaft 20 through a ball-bearing 25 is a fly- or inertia-wheel 24. The upper end of shaft 20 has a flange 26 overlying the inner race of the ball bearing and rotatably mounted on the flange is a supporting plate 27 surrounding shaft 20. Above plate 27 the shaft 20 has a peripheral groove in which is fitted a three-armed spring element 28, retained in position by a circlip retainer 29. The spring element 28 presses the supporting plate 27 into frictional engagement with flange 26 so that said plate is normally rotated with the shaft 20 and wheel axle 21.

Secured to the upper side of inertia wheel 24 at one side of it by means of screws 32 of insulating material, is a conductive strip 30 formed with two spaced contact elements 31a and 31b. An insulating strip 33 is interposed between the conductive strip 30 and the nearby surface of the metallic inertia wheel 24. A springy contact strip 34 in electrical contact with the strip 30 and hence with contact elements 31a, 31b extends from the center of strip 34 and its free end frictionally engages a contact stud 45 projecting from the center of the insulating cover 44 of the switch assembly 16, which is secured over the base 43. Contact stud 45 is electrically connected, as shown by dotted lines in FIG. 3, with an electric lead 46 which (see FIG. 1) is connected with one end of solenoid winding 17 the other end of which is connected to positive battery. The electric circuit is completed through the mass of the vehicle including shafts 21–20 and plate 27.

The contact elements 31a, 31b cooperate with respective contact lugs 38a, 38b formed on two extensions of the plate 27 (see FIG. 3), and which are normally spaced from elements 31a and 31b by clearance spaces indicated as J and J' respectively.

Secured to the upper surface of inertia wheel 24 by means of a slotted stud 35 inserted in a hole of said wheel diametrically opposite the middle of strip 32, is a member 36 formed with a pair of upstanding lugs 37a, 37b the member 36 being positioned within a recess of the support plate 27, with the lugs 37a, 37b being closely spaced with cooperating lugs 42a, 42b formed in plate 27 at opposite sides of the recess. A pair of wire torsion springs 40a and 40b are anchored at their one ends in posts 41a, 41b of plate 27 and have their mid-portions twisted around posts 39a, 39b on the upper surface of the plate, while their other ends engage the lugs 41a, 41b of said plate.

When the vehicle is not moving wheel axle 21 is not rotating and all the parts of the switch described are stationary in the neutral position illustrated, wherein both contacts 31a–38a and 31b–38b are open. The member 36 is rotatively adjustable about its pivot 35 so as to rotate plate 27 slightly in one or the other direction in opposition to torsion spring 40a, 40b, relatively to the inertia wheel 24, thereby to adjust the relative values of the clearance spaces J and J' between contact pairs 31a–38a and 31b–38b, in the neutral position of the switch assembly.

When the vehicle is moving, wheel axle 21 and with it shaft 20 is rotated say in the direction of arrow 48. Shaft 20 frictionally drives the plate 27, and the plate in turn, acting through the adjacent lugs 42b–37b, rotates the inertia wheel 24 this rotational drive being of resilient character owing to the action of torsion spring 40b. Assuming the wheel axle decelerates from its steady velocity, plate 27 can be regarded as being rotated clockwise (FIG. 3) relatively to the inertia wheel 24, disengaging lugs 37b–42b and relieving spring 40b, and engaging lugs 37a–42a and tensioning spring 40a. Assuming the rate of deceleration is high enough as in the case of a violent braking action with a danger of skidding, the angle of relative rotation is large enough to cause engagement between the contact elements 31a and 38a whereupon the energizing circuit for solenoid 17 is completed, shifting the spool of inertia valve 18 to connect the brake cylinder 1 with exhaust reservoir 19. This reduces the braking pressure to zero, and the wheel is immediately re-accelerated by its relative motion over the road surface, so that contacts 31a–38b separate, de-energizing solenoid 17 and hence re-establishing the braking pressure in cylinder 1. In prior inertia switches, when adjusted to a high degree of sensitivity the repetitive sequence of events just described has led to an objectionable condition in which the brakes were released and applied many times in succession at a high rate of frequency, until finally the wheel has resumed its normal velocity relatively to the road surface so that there is no longer any danger of skidding and the brakes would remain applied. Before this occurred, however, the aforesaid on-and-off action of the brakes created instability lining wear, and an additional skidding hazard.

In the improved double-acting inertia switch illustrated, such a condition does not arise. That is, after the first closure of contacts 31a–38a to energize solenoid 17 and release the brakes, the subsequent re-acceleration of the wheel if high enough is immediately operative to cause a relative rotation of plate 27 counterclockwise with respect to the flywheel 24, and thereby closes the second pair of contacts 31b–38b provided in accordance with the invention. Since closure of these contacts is operative to energize the solenoid 17 just as is the closure of contacts 31a–38a, the brakes remain released until the wheels have decelerated substantially to their normal running speed relatively to the ground surface, at which time both contact pairs 31a–38a and 31b–38b remain open, and the solenoid 17 remains deenergized and the brake pressure remains applied without any danger of either blocking the wheels or skidding.

The invention is therefore seen to achieve the objects assigned to it, in that it positively prevents wheel block due to excessive braking and at the same time completely eliminates the tendency, present in prior devices of this class, to an objectionable, rapid cyclic alternation of brake applying and releasing actions.

Various modifications may of course be introduced into the structural details of the single exemplary embodiment illustrated and described without exceeding the scope of the appended claims. Thus, while the preferred embodiment of the inertia switch includes a friction slip drive coupling between the wheel axle and the plate 27 as described in said prior patent identified above, such provision is not essential. Various other changes may be introduced by those familiar with the art on having been acquainted with the teachings of the present invention.

What is claimed is:

1. An inertia switch responsive to deceleration and acceleration of a revolving element comprising a support structure mounted on the revolving element for rotation with the latter, a flywheel turnable on said support structure, first and second springs carried by said support structure and having spaced apart portions capable of flexing in opposite directions that are approximately peripheral with respect to the axis of rotation of the support structure, a drive member extending between said spaced apart portions of the springs and engageable with the latter, means adjustably mounting said drive member on said flywheel for adjusting movement relative to the latter between said portions of the springs in directions that are substantially circumferential with respect to the axis of the flywheel so that said drive member and springs cooperate to form a rotatable coupling between said flywheel and support structure which permits relative turning thereof by selective flexing of said springs and also by adjustment of said drive member relative to said flywheel, switch contact means on said flywheel, a first contact on said support structure which is normally spaced from said switch contact means in one direction of relative turning of said flywheel and support structure and engageable with the switch contact means only upon predetermined flexing of said first spring in response to said deceleration, and a second contact on said support structure which is normally spaced from said switch contact means in the opposite direction of said relative turning and engageable with said switch contact means only upon predetermined flexing of said second spring in response to said acceleration, relative turning of said flywheel and support by adjustment of said drive member serving to vary the normal spacing between said switch contact means and said first and second contacts.

2. An inertia switch as in claim 1; wherein said means adjustably mounting the drive member on the flywheel is a pivot about which said drive member is eccentrically movable.

References Cited in the file of this patent

UNITED STATES PATENTS

| | | |
|---|---|---|
| 2,363,611 | Newell | Nov. 28, 1914 |
| 2,519,124 | Eksergian | Aug. 15, 1950 |
| 2,626,998 | Coombes | Jan. 27, 1953 |
| 2,972,027 | Henry-Biabaud | Feb. 14, 1961 |
| 2,991,131 | Henry-Biabaud | July 4, 1961 |
| 2,998,498 | Brock | Aug. 29, 1961 |